United States Patent [19]

Wisener et al.

[11] Patent Number: 4,671,880
[45] Date of Patent: Jun. 9, 1987

[54] METHOD FOR INHIBITING ALUMINUM-BASED DEPOSITION IN WATER SYSTEMS

[75] Inventors: Allison T. Wisener, Lafayette, La.; Pamela J. Peerce-Landers, Pottstown, Pa.

[73] Assignee: Betz Laboratories, Inc., Trevose, Pa.

[21] Appl. No.: 818,501

[22] Filed: Jan. 10, 1986

[51] Int. Cl.$^4$ ............................................. C02F 5/10
[52] U.S. Cl. ................................. 210/699; 210/701; 252/180
[58] Field of Search ........................... 210/698–701; 252/180, 181

[56] References Cited

U.S. PATENT DOCUMENTS

| | | | |
|---|---|---|---|
| 3,709,816 | 1/1973 | Walker | 210/701 |
| 3,806,367 | 4/1974 | Lange et al. | 210/701 |
| 4,500,693 | 2/1985 | Takehara et al. | 210/701 |
| 4,560,481 | 12/1985 | Hollander | 422/17 |

Primary Examiner—Peter Hruskoci
Attorney, Agent, or Firm—Alexander D. Ricci; Bruce E. Peacock; James D. Dee

[57] ABSTRACT

A method of controlling deposition and fouling in an aqueous mediums, such as in cooling water systems, wherein aluminum species are present in the system water. Normally, such aluminum species presence is caused by clarifier upsets and the like which in turn cause $Al^{+3}$ contamination of the cooling system makeup water. The method comprises addition of certain water soluble acrylic acid type/allyl hydroxyl propyl sulfonate ether copolymers to the system.

7 Claims, No Drawings

METHOD FOR INHIBITING ALUMINUM-BASED DEPOSITION IN WATER SYSTEMS

FIELD OF THE INVENTION

The present invention pertains to methods for inhibiting aluminum based deposition and fouling in water systems prone to such problems.

BACKGROUND OF THE INVENTION

Aluminum compounds such as alum, sodium aluminate, etc., have been used for years as coagulant aids to help clarify influent water. These aluminum containing materials neutralize the charge on turbidity particles in the water and hydrolyze to form insoluble precipitates that, in turn, entrap additional particles. In most cases, these large particles (flocs) settle with the aid of clarifier or like devices and are collected as sludge exiting from the clarifier sludge draw off line. Ideally, clarified effluent water flows over the top of the clarifier into a collection weir and is then ready for further water treatment processes such as filtration, softening and ion exchange, or the effluent can be used directly, without further processing, as makeup water to an operating system such as a cooling or boiler system.

Occasionally, clarifier system upsets cause the aluminum containing flocs or particles to "carryover" or flow into the effluent collection weir. In these instances, troublesome aluminum induced deposits can form in cooling systems or boiler systems which are supplied with such aluminum containing makeup water.

Carryover aluminum is usually in the trivalent state and may, depending on water chemistry, exist in the form of aluminum hydroxide, aluminum silicate, aluminum phosphate, aluminum sulfate, etc. The problem may be encountered at as low as 0.5 ppm $Al^{+3}$ in the system water. Moreover, when anionic deposit control agents, such as polyacrylates, are used in the cooling or boiler system, the available carryover $Al^{+3}$ or its hydrated $Al(OH)_3$ form or any resulting $Al^{+3}$ containing compound can interfere with the deposit control agent, thus rendering the latter incapable of performing its intended deposit control function.

Accordingly, there is a need in the art to provide a treatment that may be effectively used to minimize water system fouling in systems experiencing the aforementioned problem of aluminum carryover.

These and other problems are alleviated by addition to the requisite aluminum containing system water of a specific water soluble acrylic acid/allylhydroxypropyl sulfonate ether copolymer (hereinafter AA/AHPSE).

PRIOR ART

In example 3 of U.S. Pat. No. 4,500,693 (Takehara, et. al.), an AA/AHPSE copolymer is reported. Polymers of the generic class encompassing such AA/AHPSE polymers are disclosed in the patent as being useful aqueous slurry dispersants for inorganic pigments and as scale-preventing agents in cooling water systems. Table 1 of the patent pertains to calcium carbonate inhibition tests in which the AA/AHPSE polymer of example 3 is tested.

Additionally, AA/AHPSE copolymers have been available commercially for several years prior to the effective date of the '693 patent and have been advertised as being effective calcium sulfate and calcium carbonate scale control agents.

Despite the above patent and the commercial availability of the copolymer, we know of no prior art reference or use of the copolymer in system waters prone to $Al^{+3}$ based fouling.

DESCRIPTION OF THE INVENTION

Preliminary laboratory tests under simulated cooling water conditions have indicated that AA/AHPSE copolymers are effective in controlling deposits and minimizing corrosion even in the presence of from about 0.5 ppm-10 ppm $Al^{+3}$ (as $Al^{+3}$). Other data demonstrate that the AA/AHPSE copolymers can be used as a "top-off" treatment in combination with known deposit control agents as an aid in abating aluminum based deposit formation and fouling after same have already been encountered in the water system.

Although the treatment of the invention is particularly well-suited for use in cooling water systems experiencing $Al^{+3}$ based deposit and fouling problems, the invention is applicable in other water system environments wherein $Al^{+3}$ is present in an amount sufficient to form deposits or interfere with the normal function of the system's deposit control agent. Such other systems include boiler, gas cleaning, desalination and dust control systems.

Specifically, the water soluble copolymers that may be used comprise repeat units moieties (a) and (b) wherein the repeat unit moiety (a) comprises the structure:

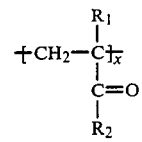

and wherein repeat unit moiety (b) comprises the structure:

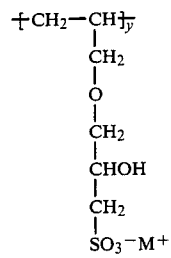

wherein x and y are integers and the ratio of x:y may be in the range of about 30:1 to 1:20, $R_1$ is H or lower alkyl ($C_1$-$C_3$), $R_2$ is OH, OM, or $NH_2$, M is H or a water soluble cation.

The number average moleculr weight ($\overline{Mn}$) of the copolymer may be between about 1,000 to 1,000,000. The only essential criterion regarding molecular weight is that the copolymer be water soluble. A preferred molecular weight ($\overline{Mn}$) is between about 2,000–10,000.

As stated above, the molar ratio x:y of the repeat units may be 30:1 to 1:20, with a molar ratio x:y of 10:1 to 1:5 being even more preferred. At present, the copolymer preferred for commercial usage is a copolymer of acrylic acid (AA)/allyl 2-hydroxypropyl sulfonate ether (AHPSE) wherein the molar ratio AA:AHPSE is 6:1 and the molecular weight ($\overline{Mn}$) is between about 2,000–6,500.

As to preparation of the (meth) acrylic acid type monomer (repeat unit a in the above formula), such synthetic preparatory routes are well known and do not need repeating in detail herein. Suffice it here to say that acrylic acid is commonly produced via hydrolysis of acrylonitrile or via oxidation of acrolein. Other well known vinyl containing monomers such as methacrylic acid and acrylamide may also be utilized as repeat unit a in the first formula.

The allyl hydroxy propyl sulfonate ether monomer (AHPSE) (repeat unit b in the above formula) may conveniently be prepared via a ring opening reaction of the epoxy group of an allyl glycidyl ether precursor. Sulfonation of the epoxy group with sodium sulfite in the presence of a phase transfer catalyst such as tetra-n-butylammonium bisulfite or with fuming sulfuric acid containing sulfur trioxide will produce the sulfonic acid group and hydroxy group of the AHPSE. The resulting monomer can be further neutralized with caustic or other basic material. The reaction is illustrated by the following mechanism:

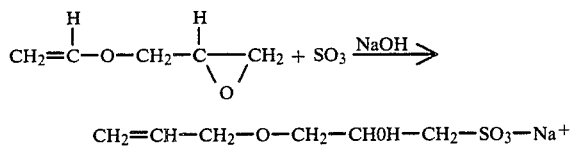

$$CH_2=CH-CH_2-O-CH_2-CHOH-CH_2-SO_3-Na^+$$

After the desired monomers have been obtained, free radical chain addition polymerization may proceed in accordance with conventional solution polymerization techniques. Polymerization initiators such as persulfate initiators, peroxide initiators, etc., may be used. Preferably, the requisite monomers are mixed with water and alcohol (preferably isopropanol). The resulting polymer may be isolated by well-known methods such as distillation, etc., or the resulting polymer may simply be used in its aqueous solution.

The copolymers should be added to the water system having $Al^{+3}$ present in the water in an effective amount for the purpose. This amount will vary depending upon the particular system for which treatment is desired and will be influenced by factors such as pH, temperature, water quantity and the concentration in the water of the troublesome $Al^{+3}$ species or compound comprising such ion.

For the most part, the copolymers will be effective when used at levels of about 0.1–500 parts per million parts of water, and preferably from about 1.0–100 parts per million of water contained in the aqueous system to be treated. The polymers may be added directly into the desired water system in a fixed quantity and in the state of aqueous solution continuously or intermittently.

The preferred environment for use is in cooling water systems wherein a clarifier upset or the like has resulted in the presence of $Al^{+3}$ or any of its resulting compounds in the system makeup source. The phrase "$Al^{+3}$ resulting compounds" as used herein refers to any compound in which the $Al^{+3}$ ions is either chemically bound or physically attached. For instance, depending upon water chemistry, pH and temperatures, such compounds could include aluminum phosphate, aluminum sulfate, sodium aluminate, alum (i.e., aluminum ammonium sulfate or aluminum potassium sulfate), aluminum silicate or aluminum hydroxide. Additionally, although the exact mechanism for aluminum induced fouling is not presently known to us, complexes or ligands formed from $Al^{+3}$ and organic polymer deposit control agents such as the polyacrylates, etc., may also be formed. Such ligand or complex formation is especially troublesome since the deposit control agent is not then available to provide its intended deposit control function. Such complexes or ligands are also to be included within the ambit of the phrase "$Al^{+3}$ resulting compounds". The phrase "aluminum species" encompasses both $Al^{+3}$ ions and "$Al^{+3}$ resulting compounds".

As stated hereinabove, the AA/AHPSE copolymer may also be used as a "topoff" agent in combination with known deposit control agents in systems wherein $Al^{+3}$ species or $Al^{+3}$ resulting compound fouling has already been encountered. In these particular applications, the AA/AHPSE copolymer may be fed to the system within the range of from about 0.1–500 ppm with the deposit control agent also being fed to the system within the range of about 0.1–500 ppm.

As to such known deposit control agents, the following are exemplary:
(1) polyacrylic acid
(2) polymethacrylic acid
(3) sulfonated styrene/maleic anhydride polymers
(4) polyacrylamides
(5) isopropenylphosphonic acid polymers and copolymers
(6) acrylic acid/hydroxylated lower alkyl acrylate polymers
(7) diisobutylene/maleic anhydride polymers
(8) acrylic acid/acrylamido-2-methylpropane sulfonic acid copolymers.

In accord with the patent statutes, the best mode has been set forth. However, it will be apparent to those skilled in the art that many modifications can be made without departing from the intention herein disclosed and described, the scope of the invention being limited solely by the scope of the attached claims.

We claim:
1. A method of controlling deposition and fouling in an aqueous medium contained within a cooling water system of the type comprising aluminum species present in said medium in an amount necessary to cause said deposition or fouling, wherein said aluminum species is admitted to said cooling water system from a clarified effluent water makeup source which has been contaminated by a clarifier upset, said method comprising adding to said medium an effective amount of a water soluble copolymer comprising repeat unit moieties (a) and (b) wherein said repeat unit moiety (a) comprises the structure:

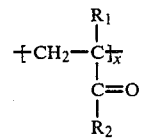

and wherein repeat unit moiety (b) comprises the structure:

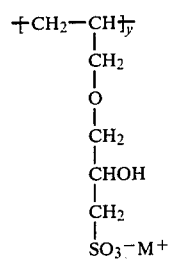

wherein x and y are integers and the ratio of x:y is in the range of about 10:1 to 1:5, $R_1$ is H or lower alkyl ($C_1$–$C_3$), $R_2$ is OH, or OM, M is H or a water soluble cation, and wherein the number average molecular weight ($\overline{Mn}$) of said copolymer is between about 1,000 to 1,000,000.

2. A method as recited in claim 1 wherein said number average molecular weight ($\overline{Mn}$) of said copolymer is between about 2,000–10,000.

3. A method as recited in claim 1 wherein said water soluble copolymer is added to said aqueous medium in an amount of about 0.1–500 parts polymer based upon 1 million parts of said aqueous medium.

4. A method as recited in claim 1 wherein said repeat unit (a) comprises acrylic acid or water soluble salt form thereof.

5. In a cooling water system of the type in which from 0.1–500 ppm of a deposit control agent are admitted to said cooling water system and wherein $Al^{+3}$ species is present in said cooling system water in a range of from about 0.5–10 ppm $Al^{+3}$ (as $Al^{+3}$), wherein said $Al^{+3}$ species is admitted to said cooling water system from a clarified effluent water makeup source which has been contaminated by a clarifier upset, the improvement comprising also admitting to said cooling water an effective amount of a water soluble copolymer I comprising repeat unit moieties (a) and (b) wherein said repeat unit moiety (a) comprises the structure:

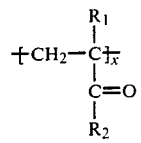

and wherein repeat unit moiety (b) comprises the structure:

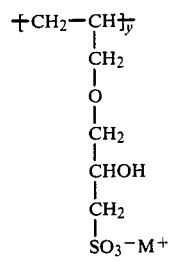

wherein x and y are integers and the ratio of x:y is in the range of about 10:1 to 1:5, $R_1$ is H or lower alkyl ($C_1$–$C_3$), $R_2$ is OH, or OM, M is H or a water soluble cation, said copolymer I having a number average molecular weight ($\overline{Mn}$) between about 1,000 to 1,000,000, and also being admitted to said water in an amount of from about 0.1–500 ppm, to control deposition and fouling by said $Al^{+3}$ species.

6. A method as recited in claim 5 wherein said deposit control agent comprises a member selected from the group consisting of polyacrylic acid, polymethacrylic acid, sulfonated styrene/maleic anhydride copolymers, polyacrylamides, isopropenylphosphonic acid polymers and copolymers, acrylic acid/hydroxylated lower alkyl acrylate polymers, diisobutylene/maleic anhydride copolymers and acrylic acid/acrylamido-2-methylpropane sulfonic acid copolymers.

7. A method as recited in claim 6 wherein said repeat unit (a) of copolymer I comprises acrylic acid or water soluble salt form thereof, and the number average molecular weight of said copolymer I being between about 2,000–10,000.

* * * * *